United States Patent [19]

Rayfield

[11] 4,253,472
[45] Mar. 3, 1981

[54] CONCAVE CLEARANCE INDICATOR

[75] Inventor: James F. Rayfield, New Holland, Pa.

[73] Assignee: Sperry Corporation, New Holland, Pa.

[21] Appl. No.: 93,575

[22] Filed: Nov. 13, 1979

[51] Int. Cl.³ .............................................. A01F 12/28
[52] U.S. Cl. ............... 130/27 S; 130/27 JT; 130/27 T
[58] Field of Search ................ 130/27 L, 27 S, 27 JT, 130/27 T, 27 R

[56] References Cited

U.S. PATENT DOCUMENTS

| | | | |
|---|---|---|---|
| 1,772,321 | 8/1930 | Ossing | 130/27 |
| 2,931,363 | 4/1960 | Bulin | 130/27 S |
| 2,960,988 | 11/1960 | Peterson | 130/6 |
| 3,552,396 | 1/1971 | Gerhardt et al. | 130/27 |
| 3,626,472 | 12/1971 | Rowland-Hill | 130/27 T |
| 3,631,862 | 1/1972 | Rowland-Hill | 130/27 L |
| 3,742,686 | 7/1973 | Rowland-Hill | 130/27 T |
| 3,771,530 | 11/1973 | Wassell | 130/27 JT |
| 3,949,761 | 4/1976 | Mortier et al. | 130/27 L |

Primary Examiner—Jay N. Eskovitz
Attorney, Agent, or Firm—Frank A. Seemar; Larry W. Miller; James R. Bell

[57] ABSTRACT

In a harvesting and threshing machine having concaves cooperative with rotatable threshing and separating apparatus there is provided a shearbolt safety mechanism coupled to a concave clearance indicator so that when a foreign object enters the threshing and separating apparatus and exerts a force above a predetermined level between the concaves and the threshing and separating apparatus, the shearbolt safety mechanism is effective to cause the concaves to drop to a fully lowered position and the concave clearance indicator to indicate the positioning of the concaves to the operator.

3 Claims, 7 Drawing Figures

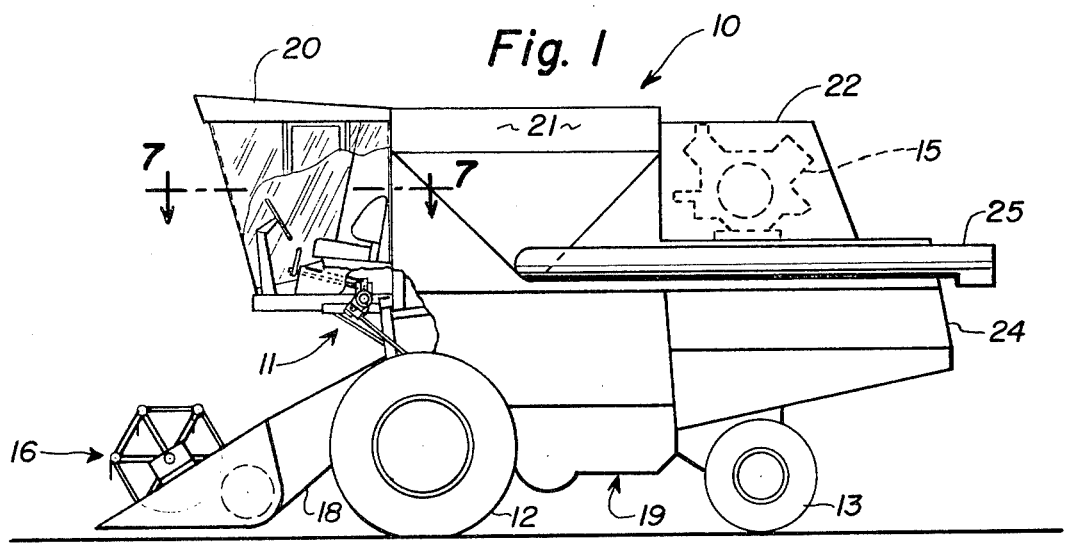
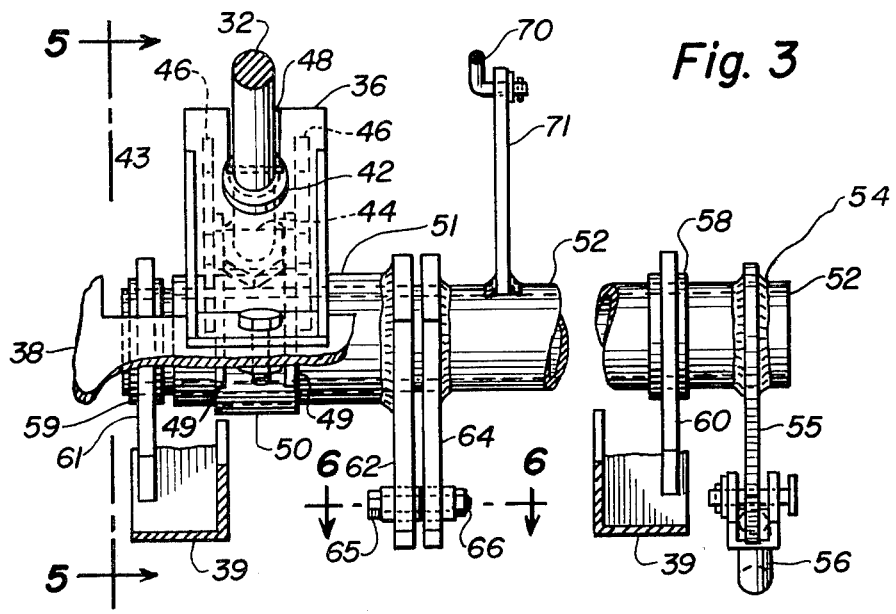
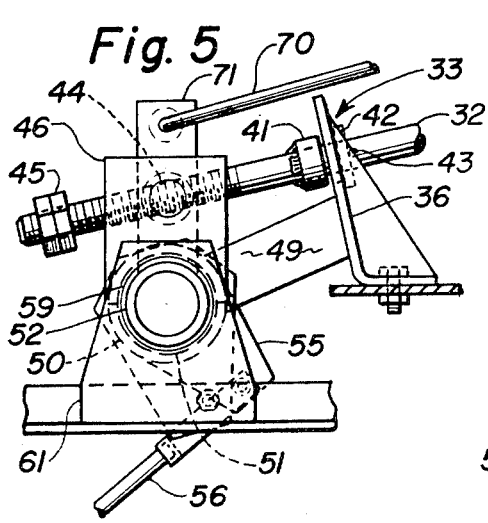
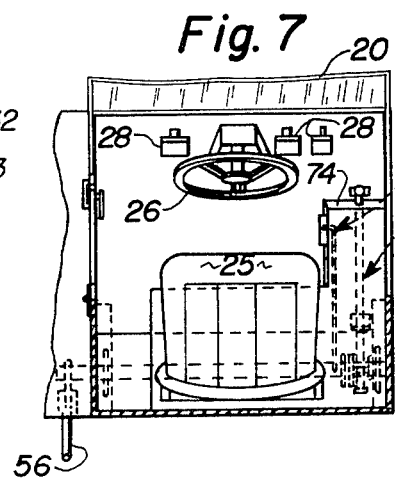
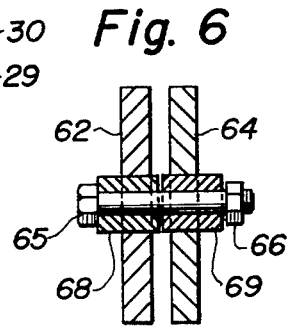

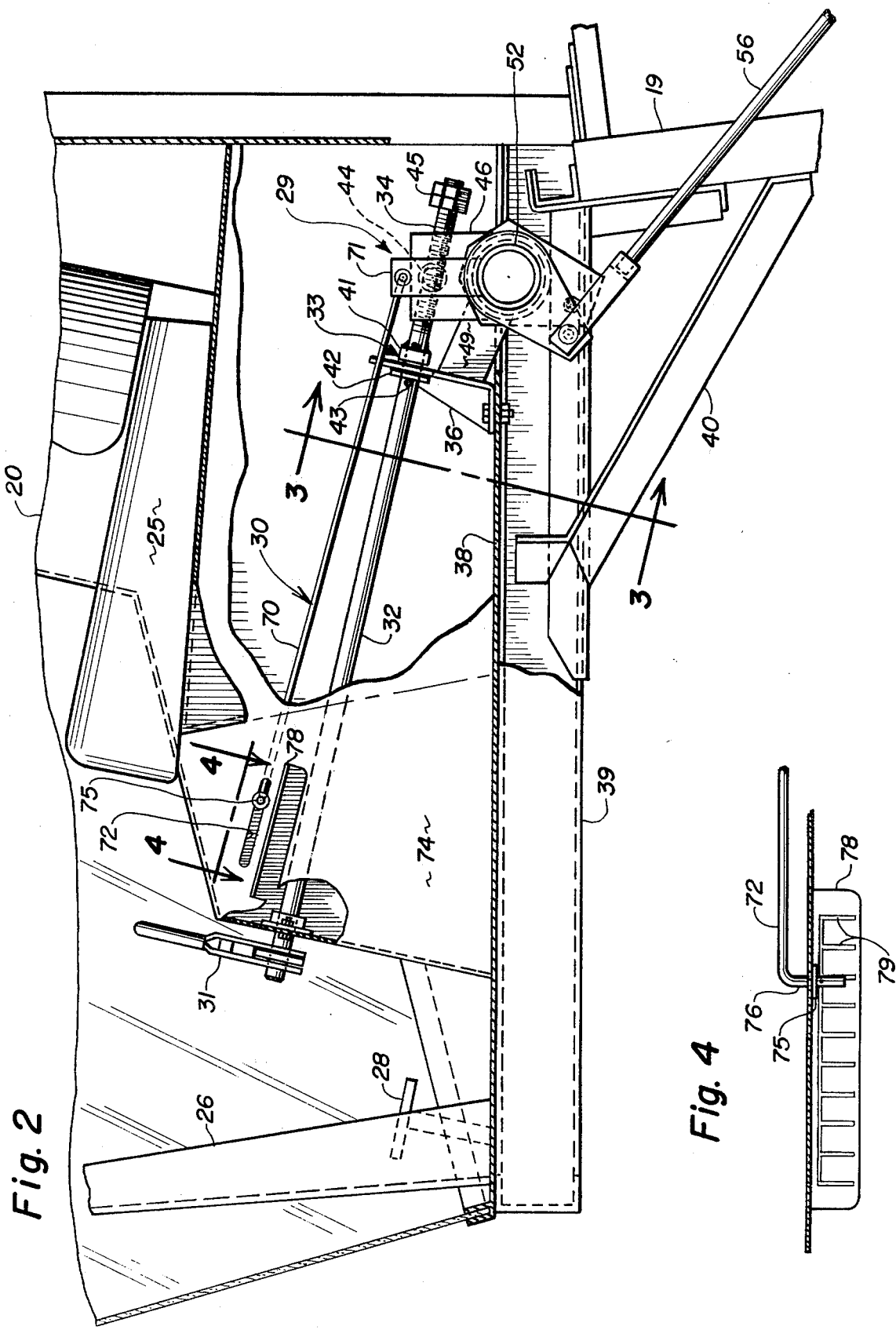

CONCAVE CLEARANCE INDICATOR

BACKGROUND OF THE INVENTION

This invention relates generally to crop harvesting and threshing machines, more commonly known as combines, and more particularly, to the apparatus used to indicate and control the clearance between the threshing concaves and the threshing apparatus. Specifically, the invention is directed to a concave adjustment mechanism which indicates the positioning of the concaves to the operator within the operator's cab and which is adapted to permit the concaves to drop to a fully lower position upon the exertion of a predetermined amount of pressure between the threshing apparatus and the concave, such as when a foreign object, like a rock, is fed into the combine. The invention also encompasses an improved system for adjusting the clearance between the threshing apparatus and the concaves. This invention is applicable to all types of combines which utilize some type of an adjustable concave system beneath a threshing machanism, although it will be discussed primarily in the context of use within an axial flow type of combine utilizing multiple threshing and separating rotors.

Conventional combines pass the crop material to be threshed between a rotary cylinder and a stationary concave in a direction that is normal to the axis of the rotating cylinder and parallel with the longitudinal axis of the combine frame. In this system much of the grain contained in the crop material fed to the cylinder and the concave passes through the concave as threshed grain. The remainder of the material is conveyed to separating components of the combine that traditionally include reciprocating or oscillating straw walkers, grain pans and chaffer sieves. Occasionally, foreign objects, such as stones or pieces of metal, are picked up by the combine header and fed via the infeed housing into the threshing cylinder. When this occurs, some damage can be inflicted upon the generally semi-cylindrical concave which underlies the threshing cylinder by the foreign object as it makes its single pass about the cylinder. Since the threshing concave and cylinder extend transversely across the width of a conventional combine, any damage that is inflicted upon the concave or cylinder will be along a rather narrow path.

Combines of the axial flow type, in contrast, utilize single or dual rotary threshing and separating apparatus, typically rotors, that permit the crop material to pass over the concave during the threshing process three or more times. The concave generally run from front to rear and underlie a single or dual rotor system that is parallel to the longitudinal axis of the combine. An alternative design approach utilizes a rotary threshing and separating system wherein the rotor and the concaves lie transverse to the longitudinal axis of the combine. In either design, the longer area of contact between the rotors and the concave of necessity greatly increases the risk of damage to either or both the rotors and the concaves when foreign objects such as rocks or metal are fed into the threshing apparatus.

The need, therefore, to protect the concaves and the rotors from damage which can occur by the passage of foreign objects, such as rocks or metal, into the threshing apparatus is far greater in the axial flow type of combines than in the conventional type of combines. Therefore, various protective devices are used to minimize the damage that may occur to these components.

Stone traps have been routinely utilized in an attempt to collect stones and other hard objects prior to their entering the threshing apparatus. These traps are generally located in the infeed housing. Shear bolt protective mechanisms are provided with the concave support frame so that when pressure above a predetermined level is exerted between the rotor and the concaves, the shear bolt fails permitting the concave to drop to a fully lowered position. This lowering of the concaves thus prevents the foreign object from being forced by the rotating rotors against the concaves and inflicting damage upon either mechanism.

The dropping of the concaves due to the failure of a shear safety mechanism, however, presents another problem which has not been previously addressed in axial flow type of combines. Since the dropping of the concaves upon contact with a foreign object between the rotor and the concave occurs without any operator involvement, it is entirely possible for an operator to continue harvesting crop material from the field after the shear safety mechanism has failed without being aware of the fact that the concaves have dropped. This dropping of the concaves in almost all cases will expand the clearance betweeen the rotor and the concaves beyond the optimal threshing distance. It is possible for an operator harvesting small grained crop material, such as wheat, to have a 10% to 15% drop in efficiency of the machine when the concaves have dropped to the fully lowered position. It is even possible for the operator to continue working all day without knowing the concaves have dropped since there is no indicator within the cab which readily transmits this information.

The foregoing problems are solved with the design of the machine comprising the present invention by providing a concave adjustment indicator coupled with a concave shear bolt failure mechanism to indicate to the operator when the shear safety mechanism has failed and the concaves have dropped to the fully lowered position.

SUMMARY OF THE INVENTION

It is an object of the present invention to provide a concave control and adjustment mechanism that is easy to operate and simple to maintain.

It is another object of the present invention to provide a concave control adjustment mechanism which indicates to the operator when the concaves have dropped to a fully lowered position due to the failure of a shear safety mechanism.

It is a feature of the present invention that the concave clearance is easily adjusted between the rotors and the concaves by means of a ratchet handle, thereby permitting the adjustment to take place fully from the operator's platform area.

It is another feature of the present invention that there is provided a shear safety mechanism connected to the supporting linkage of the concave and the concave adjustment indicator which will fail upon a foreign object entering the combine and exerting a force against the concaves and the rotor which is greater than a predetermined level to thereby effect the dropping of the concaves to the fully lowered position.

It is a further feature of the present invention that the concave adjustment indicator cooperates with a calibrated visual device to permit the operator to know at what position the concaves are set during operation.

It is an advantage of the present invention that the concave adjustment indicator automatically tells the operator when the concaves have dropped to the fully lowered position due to a sheared bolt or failed safety mechanism.

It is another advantage of the present invention that the concaves are easily adjusted and the entire system is relatively low cost.

These and other objects and advantages are obtained by providing a shear bolt safety mechanism coupled to a concave clearance indicator in a combine having concaves cooperative with rotatable threshing and separating apparatus so that when a foreign object enters the threshing and separating apparatus and exerts a force above a predetermined level between the concaves and the threshing and separating apparatus, the shear bolt safety mechanism is effective to cause the concaves to drop to a fully lowered position and the concave clearance indicator to indicate the positioning of the concaves to the operator.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a side elevation view of a crop harvesting and threshing machine with a portion cut away to illustrate the location of the concave adjustment mechanism;

FIG. 2 is a partial side elevation view of the cab of the harvesting and threshing machine illustrating in enlarged scale the concave adjustment control and indicator mechanisms with portions of the cab console cut away;

FIG. 3 is a sectional view of the concave adjustment mechanism taken along the section line 3—3 of FIG. 2;

FIG. 4 is an illustration of a calibrated scale used in conjunction with the concave position indicator within the operator's area of the cab;

FIG. 5 is a side elevation view of the concave control and adjustment mechanism taken along the lines 5—5 of FIG. 3;

FIG. 6 is a top plan view of the shear bolt mechanism taken along the lines 6—6 of FIG. 3; and FIG. 7 is a top plan view showing the concave control mechanism and the concave position indicator's positioning within the cab of the harvesting and threshing machine taken along section line 7—7 of FIG. 1.

DETAILED DESCRIPTION OF THE PREFERRED EMBODIMENT

Referring to FIG. 1, there is shown a combine indicated generally by the numeral 10 in a side elevational view with the critical portion of the instant invention illustrated partially in phantom lines and partially in solid lines with the masking portion of the side section of the combine 10 broken away. The concave clearance control mechanism and indicator is shown generally by the numeral 11. As can be seen, the combine 10 has a mobile frame mounted to a pair of primary driving wheels 12 and a pair of smaller steerable wheels 13 in the rear. It is powered by an engine 15 which is usually diesel fuel consuming. The engine is mounted to the upper portion of the combine 10 in a suitable fashion and, by means of drive belts or sprocket chains, is drivably connected to the operational components of the combine.

The combine 10 generally has a header 16 and an infeed housing 18 mounted at its front, as seen in FIG. 1. The combine 10 has a main frame or housing indicated generally by the numeral 19 that internally supports threshing and separating means (not shown), as well as the operator's cab 20 and the grain tank 21. The operator's cab 20 extends forwardly over the front of the main frame 19 and is atop the infeed housing 18. The cab 20 has a ladder (not shown) that provides access for the operator to the cab and extends outwardly and downwardly therefrom. Housings 22 and 24 enclose the engine and the discharge beater and discharge grate assembly (the latter two not being shown), respectively.

Also best seen in FIG. 1, the grain tank 21 has a pivotal unloading auger tube 25 within which is contained a rotatable auger (not shown). Tube 25 is suitably joined to the grain tank 21 and serves to unload grain to a receiving vehicle. The grain is transferred from threshing and separating means via cleaning means to the grain tank 21 during the harvesting operation.

The structure thus far has been described generally since it is old and well known in the art. The structure and interrelationships between the various operating components of the combine are described in greater detail in U.S. Pat. No. 3,626,472 issued Dec. 7, 1971, and U.S. Pat. No. 3,742,686 issued July 3, 1973, both to Rowland-Hill, hereinafter specifically incorporated by reference in their entirety insofar as they are consistent with the instant disclosure.

The threshing and separating means or rotor are surrounded on at least their bottom portions by concaves. The concaves are adjustably suspended by mechanisms making it possible to maintain the concaves in a selected relationship with respect to the rotors. This adjusting mechanism is generally a supporting frame in the shape of an H and is described in greater detail in U.S. Pat. No. 3,949,761 to Mortier et al, issued Apr. 13, 1976, hereinafter specifically incorporated by reference in its entirety, insofar as it is consistent with this disclosure. The supporting sub-frame assembly will not be discussed in any greater detail, relying upon the description provided in this aforementioned patent.

The cab 20 is shown further in FIGS. 2 and 7. An operator's seat 25 is positioned rearwardly of a steering wheel and steering column 26 and control pedals 28. A concave control mechanism, indicated generally by the numeral 29, and a concave position indicator, indicated generally by the numeral 30, are found within the cab 20.

The concave control mechanism 29 consists of a ratchet handle 31 connected to a rotatable connecting link 32, best seen in FIG. 2. The connecting link 32 is rod-shaped and on the end opposing the ratchet handle 31 is threaded to form an acme screw 34. The connecting link 32 is anchored at a thrust point 33 by passing through bracket 36, which is anchored appropriately to the floor 38 of the cab 20. The floor 38 is supported by cab beam 39 which is braced to the main frame 19 by bracing member 40. Link 32 is rotatable through bracket 36, but is retained longitudinally in place by welded ring 41 and circular plate 42, best seen in FIGS. 2, 3 and 5. Plate 42 is retained by a pin 43 appropriately placed through link 32. Threaded portion 34 of link 32 passes through a threaded hole in bar 44, best seen in FIGS. 2 and 5. The extreme limit of movement of link 32 through bar 44 is established by stop nuts 45. Bar 44, which essentially serves as a nut to the threaded portion of acme screw 34 of link 32, pivots in its two mounting arms 46, best seen in FIG. 3. As the ratchet handle 31 is rotated, the threaded portion of the acme screw end 34 screws through the threaded hole in bar 44. This causes the bar 44 to move in an arc which requires that the thrust point bracket 36 allow for some vertical movement. This is accomplished through the use of an open slot 48 cut in the center of bracket 36, best seen in FIG. 3.

Mounting arms 46 are fastened to sleeve 51. Collar 50 is mounted about sleeve 51, which in turn fits over shaft 52. This arrangement permits the sleeve 51, inside collar 50, to rotate with the mounting arms 46 and bar 44. Sleeve 51, collar 50 and arms 46 are mounted about shaft 52. Collar 50 is rigidly fastened to thrust point bracket 36 by arms 49. Bracket 55 is fastened by a weldment 54 to shaft 52 and is mounted thereabout, as seen in FIG. 3. Bracket 55 is appropriately fastened to adjustment link 56. Link 56, shown in FIGS. 2, 3, 5 and 7, connects to the concave supporting sub-assembly. Interiorly of bracket 55 is another collar 58 which fastens about shaft 52 and is best seen in FIG. 3. A similar collar 59 is fastened about the opposing end of shaft 52. Bracing members 60 and 61 are fixedly fastened to cab beams 39 and collars 58 and 59 on opposing ends of shaft 52 to rigidly mount shaft 52 for rotational movement.

Sleeve 51 is fastened for rotational movement with shaft 52 by a pair of shear plates 62 and 64, best seen in FIG. 3. Shear plate 62 is appropriately fastened to sleeve 51, such as by welding. Similarly, shear plate 64 is appropriately fastened to shaft 52. Shear plates 62 and 64 are connected by shear bolt 65, best seen in FIGS. 3 and 6. Shear bolt 65 has a retaining nut 66 and a pair of bushings 68 and 69 which insert within appropriate sized apertures within each plate. This arrangement permits the rotative motion initially transmitted by the turning of the ratchet handle 31 to be transferred through sleeve 51, shear plate 62 and shear bolt 65 to shear plate 64 and the shaft 52 to which it is anchored. Should the pressure upon the concaves be sufficient to exceed the predetermined strength level of the shear bolt 65, the bolt will fail. The failure of bolt 65 thus stops the transfer of rotative motion between shaft 52 and the sleeve 51, allowing the concaves to drop to a fully down position.

The concave position indicator 30 comprises a connecting link 70 with 90 degree bends on each end. On its lower end, link 70 is suitably joined to a mounting bracket 71, which is in turn fixedly fastened, such as by welding, to shaft 52. On its opposing end link 70 projects through a 90 degree bend into a slot 72 that is within console 74 within the cab 20. An appropriately sized ring 75 with a cotter pin retains the elbow portion 76 of connecting link 70 outside the console 74, FIG. 4, preventing the elbow portion from receding within the console. A shelf 78 is mounted beneath slot 72 and has a series of calibrations 79 marked thereon to indicate the relative positions of the concaves with respect to the rotors.

In operation the combine 10 is driven across a field of crop material to be harvested. The header 16 cuts and gathers the crop material, from which it is fed into the infeed housing 18. The infeed housing 18 directs the crop material into the rotors where the crop material is threshed and separated. The concaves underlie the rotors and are adjusted by means of the adjusting mechanism and the H-shaped supporting frame. The operator can adjust the clearance by means of turning the ratchet handle 31, which in turn rotates the connecting link 32. Link 32 then is screwed at its threaded end portion 34 through bar 44. Rotational movement of the threaded portion 34 causes the mounting arms 46 to rotate. This rotation in turn causes sleeve 51 to rotate in a desired direction. This rotational movement is transferred via shear plate 62, shear bolt 65 and shear plate 64 to shaft 52. Shaft 52 transfers the rotational movement via brackets 55 and adjustment link 56 to the concave supporting frame assembly. The relative position of the concaves with respect to the rotors are indicated by the concave position indicator 30. The rotation of the shaft 52 causes the connecting link 70, via mounting bracket 71, to move within the slot 72 in the console 74. The operator is thus able to gauge the clearance between the concaves and the rotors by looking at the calibrations 79 on shelf 78. Should a foreign object, such as a rock or a piece of metal, be fed into the threshing and separating rotors and be forced against the concaves with sufficient force to cause the shear bolt 65 to fail, shaft 52 will be disconnected from sleeve 51 and the connecting link 32, thereby permitting the concaves to fall to the fully down position. In falling to this fully down position the shaft 52 of necessity must rotate, which in turn causes the connecting link 70 with its elbow portion 76 to move in the appropriate direction within the slot 72. This movement can easily be detected by the operator by looking at the calibrations 79 to determine whether the concaves are set at the proper position for the particular crop material and conditions. In this manner, the operator can know almost immediately whether a foreign object has caused the shear bolt to fail and determine whether or not the concaves are properly set.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention, what is claimed is:

1. In a harvesting and threshing machine having a cab in which the operator controls the machine; at least one rotatable axial flow threshing and separating means in material flow communication with a crop material infeed means and a crop material cleaning means, concave means adjustably mounted about at least a portion of the threshing and separating means via mounting means and cooperative with the threshing and separating means to thresh the crop material and permit the threshed grain to pass therethrough to the cleaning means, the concave means being adjustably positioned at a predetermined distance from the threshing and separating means thereby defining a clearance ranging between a first position where the concave means are closest to the threshing and separating means and a second position wherein the concave means are furtherest therefrom, the improvement comprising:

a concave control apparatus including a ratchet handle connected to a rotatable first link, said first link being supported by a bracket and having a threaded portion extending through a threaded receptacle, said receptacle connected to move a pair of mounting arms in response to rotating movement of said first link, said arms connected to move a mounting bracket having a second link connected thereto, said second link movably extending into a slot, said slot having calibrations adjacent thereto, said mounting arms connected for movement with a sleeve and said mounting bracket connected for movement with a rod and with a concave adjustment member, said sleeve and rod each respectively connected to a pair of shear plates, said plates being interconnected by a shear bolt.

2. In a harvesting and threshing machine having:
 (a) a mobile frame to move across a field of crop material;
 (b) a cab mounted to the frame and in which the operator controls the machine;
 (c) at least one axial flow threshing and separating means rotatably mounted to the frame;
 (d) drive means mounted to the frame to drive the threshing and separating means and the machine;
 (e) infeed means mounted to the frame to receive crop material from the field and direct it to the threshing and separating means;
 (f) concave means surrounding at least a portion of the threshing and separating means adjustably mounted to the frame and movable between a first position closest to the threshing and separating means and a second position furtherest therefrom; and
 (g) a concave control apparatus including a ratchet handle connected to a rotatable first link, said first link being supported by a bracket and having a threaded portion extending through a threaded receptacle, said receptacle connected to move a pair of mounting arms in response to rotating movement of said first link, said arms connected to move a mounting bracket having a second link connected thereto, said second link movably extending into a slot, said slot having calibrations adjacent thereto, said mounting arms connected for movement with a sleeve and said mounting bracket connected for movement with a rod and with a concave adjustment member, said sleeve and rod each respectively connected to a pair of shear plates, said plates being interconnected by a shear bolt.

3. In a harvesting and threshing machine having:
 (a) a mobile frame to move across a field of crop material;
 (b) a cab mounted to the frame and in which the operator controls the machine;
 (c) at least one axial flow threshing and separating means rotatably mounted to the frame;
 (d) drive means mounted to the frame to drive the threshing and separating means and the machine;
 (e) infeed means mounted to the frame to receive crop material from the field and direct it to the threshing and separating means;
 (f) concave means surrounding at least a portion of the threshing and separating means adjustably mounted to the frame and movable between a first position closest to the threshing and separating means and a second position furtherest therefrom; and
 (g) a concave control apparatus including a first link connected to move a pair of mounting arms, said arms connected to move a mounting bracket having a second link first end connected thereto, said second link having a second end movably extending into a slot, said slot having calibrations adjacent thereto, said mounting arms connected for movement with a sleeve and said mounting arms connected for movement with a rod and with a concave adjustment member, said sleeve and rod each respectively connected to a pair of shear plates, said plates being interconnected by a shear bolt.

* * * * *